United States Patent [19]

Kawauchi et al.

[11] Patent Number: 4,610,709
[45] Date of Patent: Sep. 9, 1986

[54] METHOD FOR PRODUCING GLASS PREFORM FOR OPTICAL FIBER

[75] Inventors: Hiroshi Kawauchi; Michihisa Kyoto, both of Yokohama, Japan

[73] Assignee: Sumitomo Electric Industries, Ltd., Osaka, Japan

[21] Appl. No.: 694,284

[22] Filed: Jan. 23, 1985

[30] Foreign Application Priority Data

Jan. 24, 1984 [JP] Japan .................................. 59-9499

[51] Int. Cl.⁴ .................... C03B 37/018; C03B 37/014
[52] U.S. Cl. .................................... 65/3.12; 65/18.2; 65/DIG. 16
[58] Field of Search ...................... 65/3.12, 3.11, 18.2, 65/DIG. 16

[56] References Cited

U.S. PATENT DOCUMENTS 3,806,224 4/1974 MacChesney .................. 65/3.12 X
4,165,223 8/1979 Powers ........................... 65/3.12 X

FOREIGN PATENT DOCUMENTS 2428618   2/1980  France ........................... 65/DIG. 16
54-160414 12/1979 Japan ................................. 65/18.2
55-067533  5/1980 Japan ........................... 65/DIG. 16
58-208146 12/1983 Japan ........................... 65/DIG. 16

Primary Examiner—Kenneth M. Schor
Attorney, Agent, or Firm—Cushman, Darby and Cushman

[57] ABSTRACT

Fluorine is selectively added to a cladding portion of a glass preform by producing a soot preform which comprises a core portion and a cladding portion under such conditions that an additive concentration or a bulk density of the outermost part of the core portion is to be larger than that of the inner part thereof and heating the soot preform in an atmosphere containing fluorine or fluorine-containing compound at least for some period to obtain a transparent glass preform.

5 Claims, 10 Drawing Figures

METHOD FOR PRODUCING GLASS PREFORM FOR OPTICAL FIBER

FIELD OF THE INVENTION

The present invention relates to a method for producing a glass preform for use in the fabrication of an optical fiber. More particularly, it relates to a method for producing glass preform for use in the fabrication of an optical fiber comprising a core and a cladding in which a cladding portion of a soot preform, i.e. a fine glass particle mass, is selectively added with fluorine during sintering the soot preform to convert it into a transparent glass preform at a high temperature.

BACKGROUND OF THE INVENTION

An optical fiber comprises, as shown in the upper part of FIG. 1, a core 1 through which light propagates and a cladding 2 which surround the core. A refractive index $n_1$ of the core 1 is larger than a refractive index $n_2$ of the cladding as shown in the lower part of FIG. 1 so as to transmit light through the core. As a specific refractive index difference $\Delta n$ defined by the formula:

$$\Delta n = (n_2 - n_1)/n_1$$

is increased, an incident angle of the cladding surface at which total reflection occurs increases. Thereby, for example, power loss due to bending of the optical fiber is minimized.

Augmentation of the specific refractive index difference $\Delta n$ can be accomplished, for example, by increasing the refractive index $n_1$ of the core 1 by the addition of a metal oxide such as $GeO_2$, $Al_2O_3$ and $TiO_2$ to a core portion of the glass preform corresponding to the core 1, and by decreasing the refractive index $n_2$ of the cladding 2 by the addition of fluorine to a cladding portion of the preform corresponding to the cladding 2.

In the first method by which the refractive index $n_1$ of the core 1 is increased, due to the increase of the amount of the additive, following drawbacks may be caused:

1. Addition of the additive induces light scattering (i.e. Rayleigh scattering) in proportion to the amount of the additive, and the light scattering undesirably increases attenuation.

2. Addition of a large amount of the additive tends to cause the formation of bubbles or single crystals in the glass preform. For example, when $GeO_2$ is used as an additive, bubbles due to gaseous $GeO_2$ may be formed. When $Al_2O_3$ is used as an additive, it may form a cluster of its single crystals. The bubbles or the single crystals are the cause of the light scattering resulting in attenuation. In addition, they may be the cause of a fiber break.

The second method by which the refractive index $n_2$ of the cladding is decreased can effectively overcome the above drawbacks. Typically, this method comprises adding the additive to the core portion of the soot preform to increase its refractive index to achieve a predetermined refractive index difference between the core portion and the cladding portion and adding the fluorine to the cladding portion to decrease its refractive index by heating the soot proform at a high temperature in an atmosphere of the fluorine-containing compound to produce the glass preform having a larger specific refractive index difference. However, this method has some drawbacks as follows:

By simply heating the soot preform at a high temperature in the atmosphere of the fluorine-containing compound, the core portion is also fluorinated so that the specific refractive index difference cannot be increased. Since fluorine is an inherently highly active material, it is very difficult to control the temperature in a furnace or to adjust the concentration of the fluorine-containing compound and the treating time so as to add fluorine only to the cladding portion of the preform. In order to add fluorine only to the cladding portion of the preform having conventional distributions of the additive and of a bulk density, it is necessary to control the temperature of the furnace within about $\pm 30°$ C. Thus, it is extremely difficult to produce an optical fiber having the desired specific refractive index difference.

SUMMARY OF THE INVENTION

One object of the invention is to provide a glass preform for the fabrication of optical fibers, to a cladding portion of which, fluorine is selectively added.

Another object of the invention is to provide a method for producing a glass preform by which fluorine is selectively added to the cladding portion of the preform while it is not added to the core portion.

Accordingly, the present invention provides a method for producing a glass preform, comprising producing a soot preform which comprises a core portion and a cladding portion under such conditions that an additive concentration or a bulk density of the outermost part of the core portion is to be larger than that of the inner part thereof and heating the soot preform in an atmosphere containing fluorine or a fluorine-containing compound at least for some period to obtain a transparent glass preform.

DETAILED DESCRIPTION OF THE INVENTION

According to the method of the present invention, the additive concentration or the bulk density of the outermost part of the core portion of the fine glass particle mass, i.e. the soot preform is made larger than the inner part thereof during the production of the soot preform. Thereby, when the soot preform is sintered to convert it to a transparent glass preform, the outermost part of the soot preform is sintered at an earlier stage than the cladding portion surrounding it. The sintered part of the core prevents the penetration of fluorine in the inner part of the core when the fluorine-containing compound is added to the atmosphere in which the soot preform is heated at a high temperature to make it transparent. In addition, the temperature range in which fluorine is selectively added to the cladding is made as wide as ±150° C., and thus it is easier to control the temperature and is possible to lower the treating temperature.

It is also found that if the relative density of a part of the soot preform, namely the difference between the bulk density of said part of the soot preform and the density of said part of the transparent glass preform is more than 0.45, fluorine cannot be added to said part of the soot preform.

Accordingly, when the relative density of the outermost part of the core portion is 0.45, the relative density of the cladding portion is less than 0.45. If, at such timing, the fluorine-containing compound is added to the heating atmosphere, fluorine is added to the cladding portion but not to the inner part of the core portion, thereby the refractive index distribution having a large specific refractive index difference is achieved.

The present invention will be illustrated by making reference to the accompanying drawings by way of example.

Figure 1:
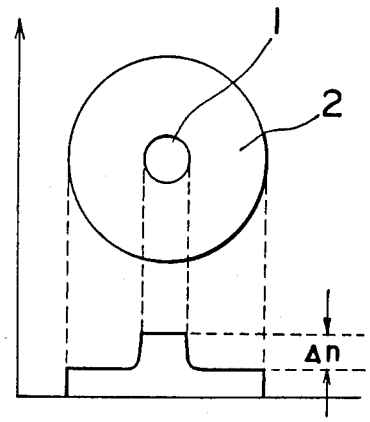
FIG. 1 schematically shows a distribution of a refractive index of an optical fiber, FIG. 2 schematically shows a flame hydrolysis process for practicing the method of the present invention.
Figure 2:
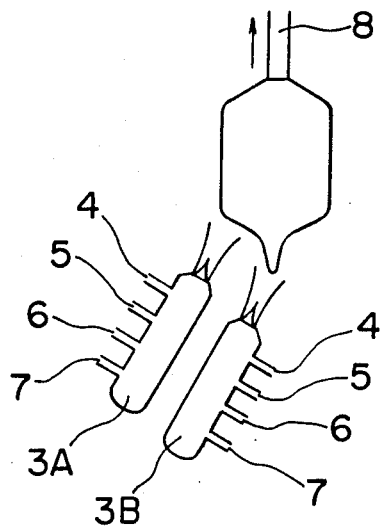

FIG. 2 schematically shows a flame hydrolysis process for producing the soot preform to be used in the present invention.

By using of multi-tube burners 3A and 3B, as a fuel gas, oxygen and hydrogen are supplied through inlets 4 and 5, respectively and gushed out through the outermost ports and the next outermost ones of the burners, respectively. Simultaneously, $SiCl_4$ as a raw material and $GeCl_4$ as an additive are supplied together with a carrier gas (e.g. an inert gas such as Ar) through inlets 7 and gushed out through the center ports of the burners and reacted. In order for the raw material to react in a space several millimeters apart form the top of the burner, Ar gas is introduced as a barrier gas through an inlet 6 and gushed out through a circular port surrounding the center one. Under such conditions, glass fine particles are accumulated on a tip of a rotating starting member 8 in its axial direction to form a rod of the fine glass particle mass, namely, a soot preform. In the above procedures, the conditions including the supplying rate of each gas or material are substantially the same as in the conventional method. Preferred conditions are demonstrated by Examples.

Figure 3:
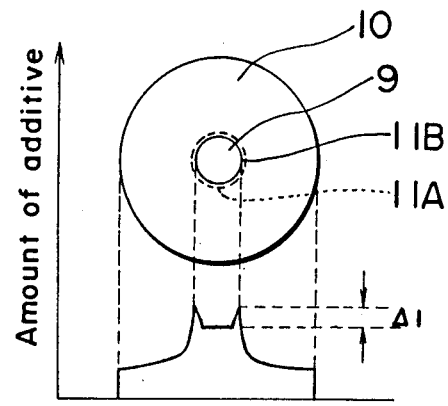
FIG. 3 shows a distribution of a metallic additive in the glass preform.
Figure 4:
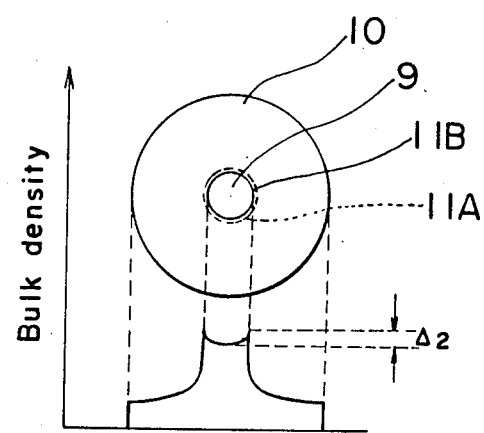
FIG. 4 shows a distribution of a bulk density of the glass preform.

Then, to increase the additive concentration or the bulk density of outermost part of the preform as shown in FIGS. 3 and 4, oxygen is supplied through the inlet 4 of the burner 3A at a rate of 8 liters/min., Ar through the inlet 6 at a rate of 2 liters/min., hydrogen through the inlet 5 at a rate of 3 to 8 liters/ min., and $SiCl_4$ together with $GeCl_4$ co-supplied at a rate of 10 to 50 ml/min. through the inlet 7. The upper burner 3A is used not only for partially increasing the additive concentration or the bulk density but also for forming the cladding portion. The additive concentration may be increased by raising the flow rate of the additive, and the bulk density may be increased by raising the flow rate of hydrogen to lower the surface temperature of the core portion.

The lower burner 3B is used solely for forming the core portion. Through the nozzle 7, $GeCl_4$ and $SiCl_4$ are simultaneously supplied at rates of 20 ml/min. and 200 ml/min., respectively and burnt in the oxyhydrogen flame.

The above described condition is one example and the method of the invention is not limited to the above described procedure.

The outermost part of the core portion of the thus produced soot preform has larger additive concentration or bulk density than the inner part of the core portion.

Then, the soot preform is dehydrated and sintered by heating it at a high temperature in a heat resistant muffle tube made of, for example, pure quartz or alumina.

In the heat treatment of the soot preform, it is preferred to carry out the treatment in an atmosphere of a chlorine-containing compound primarily for dehydrating it. To this end, the soot preform is heated at a temperature of 800° to 1,100° C. in an atmosphere to which helium gas and the chlorine-containing compound are supplied at rates of 10 liters and 100 ml per minute, respectively. The primary object of the use of the chlorine-containing compound is to dehydrated the soot preform. Specific examples thereof are $Cl_2$, $SOCl_2$, $COCl_2$, $CCl_4$, etc.

When the dehydration temperature is lower than 800° C., impurities contained in the preform are not completely removed and dehydration takes longer time. When the soot is heated at a temperature higher than 1,100° C. in the atmosphere of the chlorine-containing compound, it shrinks and the bulk density increases throughout the preform so that it is difficult to add fluorine thereto.

Further, since the chlorine-containing compound volatilizes the additive as a chloride thereof, it may be used for adjusting the distribution of the refractive index. For this end, preferred temperature is from 1,000° to 1,100° C.

After the first heating step, the second heating step is carried out primarily for adding fluorine to the preform. In this step, the temperature depends on the distributions of the additive and of the bulk density of the soot preform produced by the flame hydrolysis. Preferably, it is 1,150°±150° C. Accordingly, the outermost part of the core portion is sintered at about 1,000° C., and then the whole soot preform is sintered at about 1,700° C. in an atmosphere of the fluorine-containing compound to add fluorine only to the cladding portion. That is, in order not to add fluorine to the core portion of the soot preform, it is essential to start the supply of the fluorine-containing compound when the relative density of the outermost part of the core portion reaches 0.45 or higher.

When the soot preform is heated at a constant temperature raising rate in the muffle tube having a homogeneous temperature distribution, the fluorine-containing compound is supplied at a temperature between a temperature $T_1$ at which the relative density of the outermost part of the core portion reaches 0.45 and a temperature $T_2$ at which that of the cladding portion reaches 0.45. Thus, when the difference $\Delta T$ between the temperatures $T_1$ and $T_2$ is larger, a temperature range in which the fluorine-containing compound may be supplied is wider. In other words, as the temperature difference $\Delta T$ is smaller, it is required to more precisely control the temperature at which the fluorine-containing compound is supplied.

For larger temperature difference $\Delta T$, larger difference $\Delta_1$ of the additive concentration in FIG. 3 or larger difference $\Delta_2$ of the bulk density in FIG. 4 is preferred. However, the differences are too large, the bubbles undesirably tends to form during sintering. Preferred difference is 0.1 to 0.3% by weight for the additive concentration and 0.1 to 0.3 for the bulk density.

Figure 5:
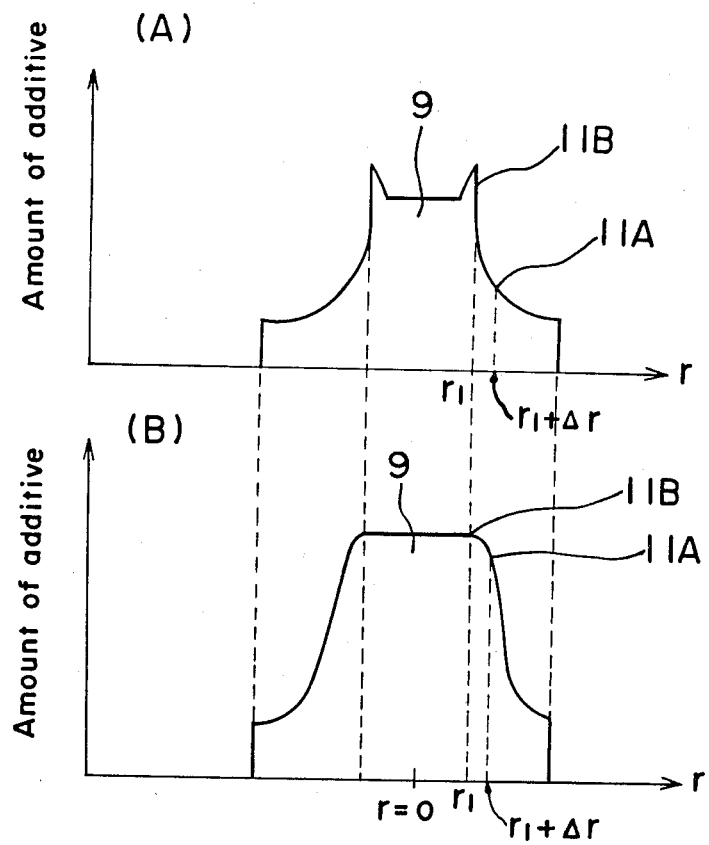
FIG. 5 shows distributions of a metallic additive in the soot preform.

Now, two cases in which the distributions of the additive concentration are as shown in FIG. 5 are compared. In the figures (A) and (B), r represents a distance in the radial direction from the center axis of the soot preform, $r_1$ is a radius of the core portion, namely the position of the outermost part 11B of the core portion in FIG. 3, $\Delta r$ is a microdistance, and $r_1 + \Delta r$ is a radius of the innermost part 11A of the cladding portion in FIG. 3.

Figure 6:
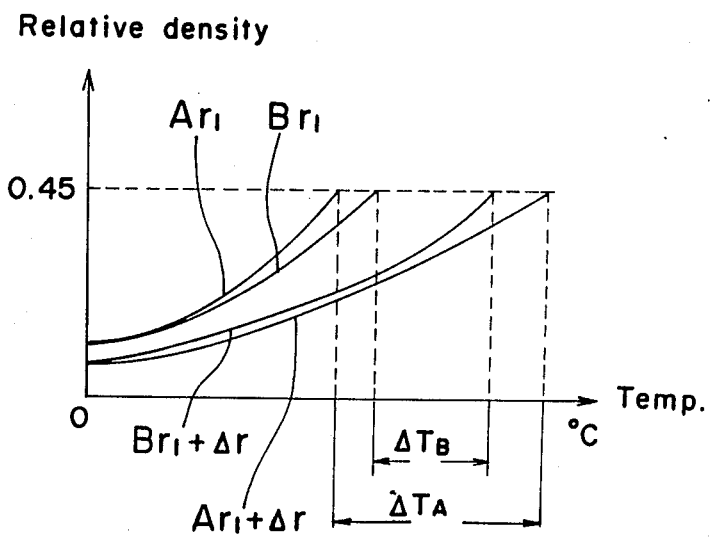
FIG. 6 shows the time-course of relative densities of the soot proforms of FIG. 5 in the radial direction.

FIG. 6 shows change of the relative density against the temperature of the soot preforms when two preforms having different additive concentrations are heated at a temperature raising rate of 16° C./min. The curves $Ar_1$ and $Br_1$ represent the changes of the relative densities of the outermost parts of the core portions of the soot preforms A and B, respectively. The curves $Ar_1 + \Delta r$ and $Br_1 + \Delta r$ represent the changes of the relative densities of the innermost parts of the cladding portions of the soot preforms A and B, respectively.

As is seen from FIG. 6, the temperature difference $\Delta T$ between the temperatures $T_1$ and $T_2$ is larger in the soot preform A than the preform B. Thus, it is more easy to control the temperature of the preform A than that of the preform B. The same may apply to the bulk density.

Although both of the additive concentration and the distribution of the bulk density of the outermost part 11A of the core portion are preferably made larger, either one of them can be made larger to obtain the same result.

In the flame hydrolysis, so-called tailing of the additive distribution may be observed in the innermost part of the cladding portion under certain conditions. To prevent the tailing, the distribution of the refractive index may be adjusted by supplying chlorine in advance.

PREFERRED EMBODIMENTS OF THE INVENTION

Example 1

Figure 7:
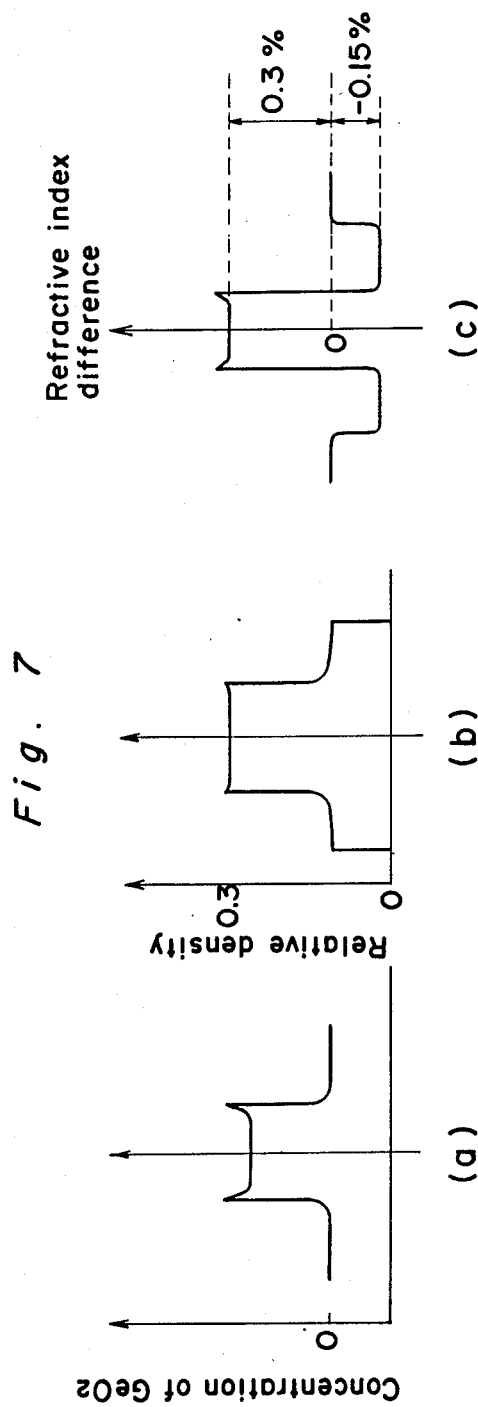
FIGS. 7A, 7B and 7C show the distributions of the $GeO_2$ concentration and of the relative density in the soot preform and the specific refractive index difference of the glass preform produced in Example 1, respectively.
Figure 10:
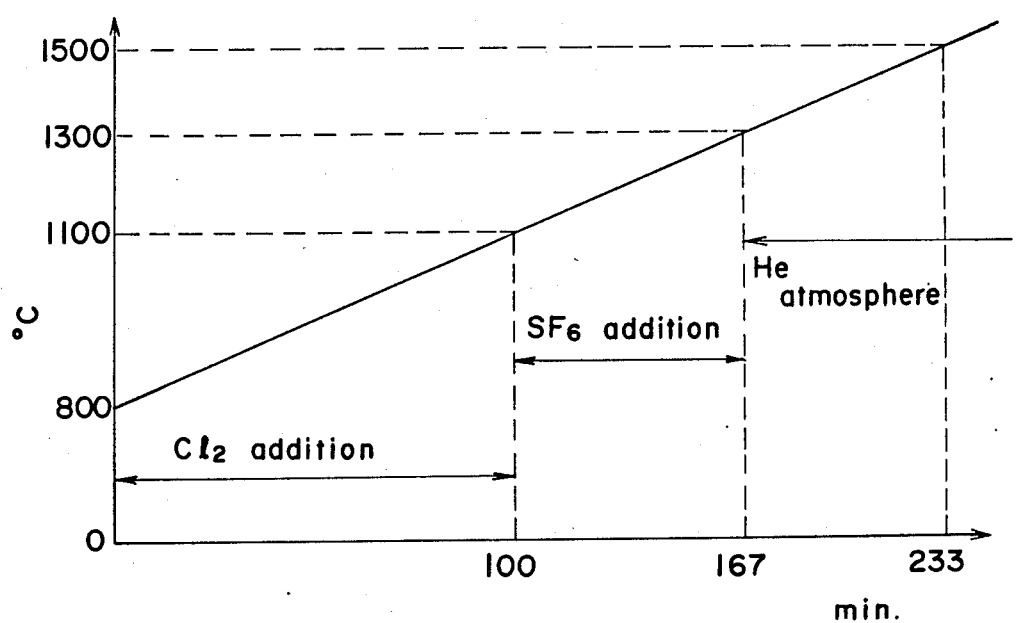
FIG. 10 shows an example of a processing pattern of the soot preform according to the present invention.

To a furnace kept at 800° C., there was charged a soot preform for a single mode optical fiber having the distributions of the additive concentration and of the bulk density shown in FIGS. 7A and 7B, respectively. Then, it was heated at a rate of 3° C./min. to 1,100° C. while supplying chlorine gas and helium gas at rates of 100 ml/min. and 10 liters/min., respectively according to the processing pattern of FIG. 10. Thereafter, the supply of the chlorine gas was terminated. The soot preform was heated to 1,300° C. while supplying $SF_6$ gas a rate of 150 ml/min, and further heated to 1,500° C. while supplying pure helium gas to produce a transparent glass preform.

The distribution of the refractive index of the thus produced glass preform is shown in FIG. 7C. The core portion had the distribution of the refractive index which corresponded to that of the additive concentration, and the refractive index of the cladding portion decreased by the degree corresponding to the amount of added fluorine. Elemental analysis with an X-ray microanalyzer (XMA) revealed that the core portion did not contain any fluorine. An optical fiber fabricated from the thus produced glass preform had $\Delta n$ values of +0.30% and −0.15% in the core and the cladding, respectively.

Comparative Example 1

To confirm the effects achieved by Example 1, a soot preform was produced by supplying hydrogen through the nozzle 5 at a rate of 2 liters/min. but no $GeCl_4$ through the nozzle 7. The thus produced soot preform had distributions of the bulk density and the additive concentration shown in FIGS. 7B and 8A, respectively, which did not have any peak.

Figure 8:
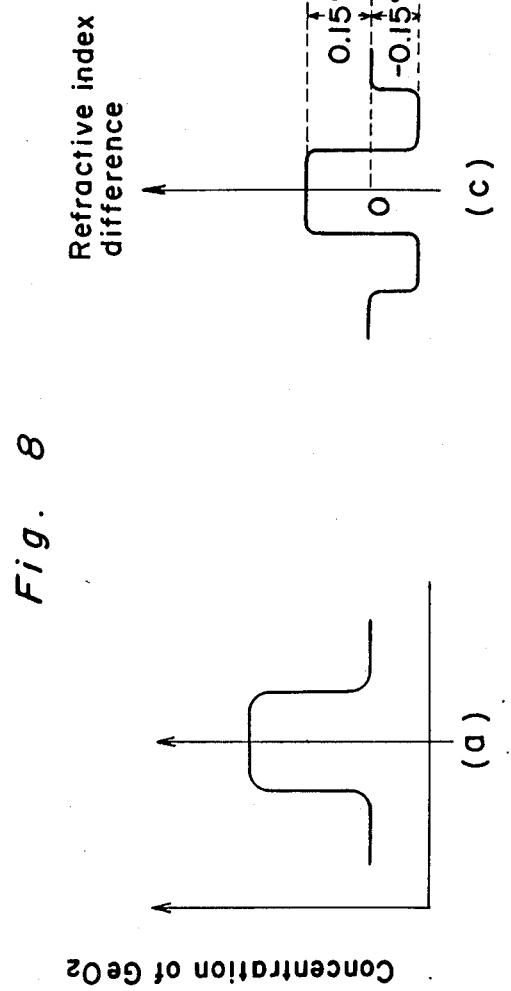
FIGS. 8A and 8B show the distribution of the $GeO_2$ concentration in the soot proform and the specific refractive index difference of the glass preform produced in Comparative Example, respectively.

The soot preform was treated in the same manner as in Example 1 to produce the glass preform. XMA elemental analysis revealed that fluorine was uniformly distributed throughout the core and cladding portions. The distribution of the refractive index is shown in FIG. 8C, from which it is understood that the distribution of the refractive index corresponds to that of the additive concentration and $\Delta n$ is not increased.

Example 2

Figure 9:
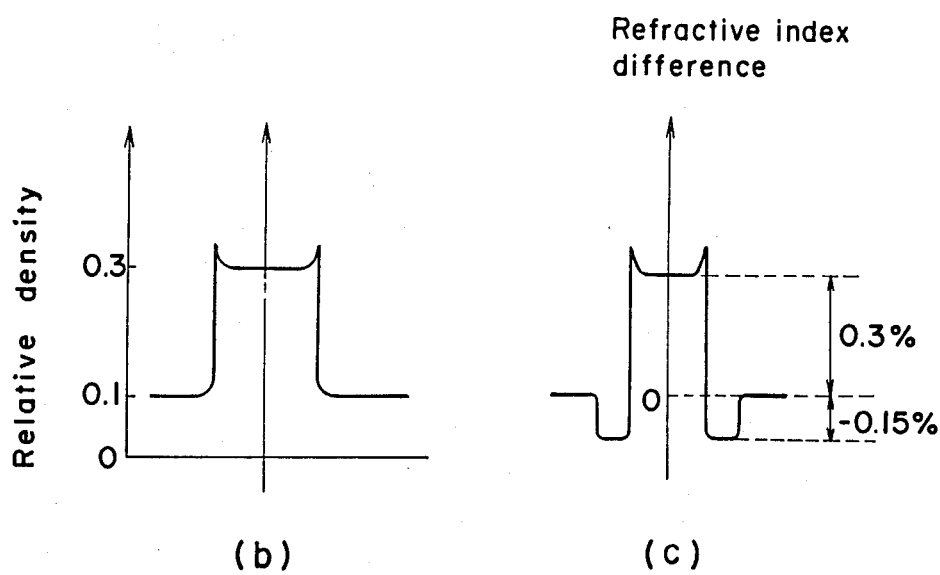
FIGS. 9A and 9B show the distributions of the relative density in the soot proform and the specific refractive index difference of the glass preform produced in Example 2, respectively.

To a furnace kept at 800° C., there was charged a soot preform for a single mode optical fiber having the distributions of the additive concentration and of the bulk density shown in FIGS. 7A and 9B, respectively. Then, it was heated at a rate of 3° C./min. to 1,050° C. while supplying chlorine gas and helium gas at rates of 100 ml/min. and 10 liters/min. Thereafter, the supply of the chlorine gas was terminated. The soot preform was heated to 1,300° C. with supplying $SF_6$ gas a rate of 150 ml/min, and further heated to 1,500° C. in a pure helium gas to produce a transparent glass preform.

The distribution of the refractive index of the thus produced glass preform is shown in FIG. 9C. The core portion had the distribution of the refractive index which corresponded to that of the additive concentration, and the refractive index of the cladding portion decreased by the degree corresponding to the amount of added fluorine. XMA elemental analysis revealed that the core portion did not contain any fluorine. An optical fiber fabricated from the thus produced glass preform had n values of +0.3% and −0.15% in the core and the cladding, respectively.

Comparative Example 2

To confirm the effects achieved by Example 2, a soot preform for a single mode optical fiber having the same distributions of the additive concentration and the bulk density as that of Comparative Example 1 was treated in the same manner as in Example 2. XMA elemental analysis revealed that fluorine was uniformly distributed throughout the core and cladding portions of the produced glass preform. The only difference between Example 2 and Comparative Example 2 was that the preform used in the latter had a smaller refractive index at the outermost part of the core portion. Thus, it is understood that the refractive index of this part greatly influences the distribution of the refractive index.

Example 3

A soot preform made of pure quartz having relative bulk densities of 0.45 and 0.25 at the outermost part of the core portion and the cladding portion, respectively was heated to 1,050° C. and dehydrated in the same conditions as in Example 2. Thereafter, the supply of the chlorine gas was terminated. The soot preform was heated to 1,650° C. with supplying helium gas and $SF_6$ gas a rate of 10 liters and 300 ml per minute to produce a transparent glass preform.

Δn of the core and cladding portions of the thus produced glass preform were 0% and −0.3%, respectively.

Although above Examples were carried out by using the soot preform for a single mode optical fiber, a soot preform for a multi mode optical fiber may be produced by the present invention. Further, a soot preform produced by the "outer deposition method" in which the fine glass particles are accumulated on a cylindrical mandrel may be treated by the method of the invention.

What is claimed is:

1. A method for producing a glass preform, comprising the steps of:

producing a soot preform which comprises a core portion and a cladding portion wherein a metal oxide additive concentration or a bulk density of a radially outer part of said core portion is larger than that of said cladding portion and is larger than that of the radially inner part of said core portion to a degree such that when said soot preform is heated, said radially outer part sinters first, and heating said soot preform in an atmosphere containing fluorine or a fluorine-containing compound until a transparent glass preform is formed, the addition of the fluorine or fluorine-containing compound in the heating step being timed such that said radially outer part sinters before said cladding portion and thereby substantially prevents the penetration of fluorine into said inner part of said core portion.

2. A method according to claim 1, wherein before the heating step is the step of heating said soot preform in an atmosphere containing a chlorine-containing compound to dehydrate said soot preform.

3. A method according to claim 1, wherein the heating step includes the step of heating said soot preform at a temperature of 1,000° to 1300° C.

4. A method according to claim 1, wherein the producing step includes the step of producing said soot preform wherein both said additive concentration and said bulk density of said radially outer part of said core portion are larger than that of said cladding portion.

5. A method as in claim 1, wherein, at the time the fluorine or fluorine-containing compound is added, said radially outer part has relative density of $\geq 0.45$, and said cladding portion has a relative density of $< 0.45$.

* * * * *